(12) United States Patent
Emr (10) Patent No.: US 9,352,991 B1
(45) Date of Patent: May 31, 2016

(54) SYSTEM FOR ENHANCED AEROBIC ACTIVITY AND BIO-MAT CONTROL FOR ONSITE WASTEWATER DISPOSAL

(71) Applicant: JRL Innovations Inc., Landing, NJ (US)

(72) Inventor: Roy Emr, Lake Hopatcong, NJ (US)

(73) Assignee: JRL Innovations Inc., Landing, NJ (US)

( * ) Notice: Subject to any disclaimer, the term of this patent is extended or adjusted under 35 U.S.C. 154(b) by 0 days.

(21) Appl. No.: 14/643,243

(22) Filed: Mar. 10, 2015

Related U.S. Application Data

(63) Continuation of application No. 13/218,758, filed on Aug. 26, 2011, now Pat. No. 8,974,670.

(60) Provisional application No. 61/377,178, filed on Aug. 26, 2010.

(51) Int. Cl.
*C02F 3/06* (2006.01)

(52) U.S. Cl.
CPC ............. *C02F 3/06* (2013.01); *C02F 2203/006* (2013.01)

(58) Field of Classification Search
None
See application file for complete search history.

(56) References Cited

U.S. PATENT DOCUMENTS

| | | | |
|---|---|---|---|
| 4,850,745 A | 7/1989 | Hater et al. | |
| 5,234,603 A | 8/1993 | Potts | |
| 5,596,836 A | 1/1997 | Benson | |
| 5,617,670 A | 4/1997 | Benson | |
| 5,634,294 A | 6/1997 | Rohoza | |
| 5,636,473 A | 6/1997 | Benson | |
| 5,641,245 A | 6/1997 | Pemberton et al. | |
| 5,893,680 A | 4/1999 | Lowry et al. | |
| 6,485,647 B1 | 11/2002 | Potts | |
| 6,726,401 B1 | 4/2004 | Potts | |
| 6,814,866 B1 | 11/2004 | Potts | |
| 6,887,383 B2 | 5/2005 | Potts | |
| 6,923,905 B2 | 8/2005 | Potts | |
| 6,939,085 B1 | 9/2005 | Posch | |
| 6,959,882 B1 | 11/2005 | Potts | |
| 6,969,464 B1 | 11/2005 | Potts | |
| 7,157,011 B1 * | 1/2007 | Potts | C02F 3/22 210/120 |
| 7,309,434 B2 | 12/2007 | Potts | |
| 7,351,005 B2 | 4/2008 | Potts | |
| 7,374,670 B2 | 5/2008 | Potts | |

(Continued)

OTHER PUBLICATIONS

Radcliffe et al., "Spreadsheet for Estimating Long Term Acceptance Rate for On-Site Wastewater Systems in Georgia", University of Georgia, Feb. 3-7, 2008, pp. 399-403, CREES National Water Conference, Reno NV.

*Primary Examiner* — Chester Barry
(74) *Attorney, Agent, or Firm* — BudzynFortunato IP Law, LLC (57) ABSTRACT

The present invention provides an aeration lateral system designed to be site specific for new septic disposal areas or retro fitting to existing septic disposal areas to break up the biological clogging sludge mat at the interface of the wastewater and imported sand or native soil fill under or adjacent to disposal areas of a typical septic system. The lateral system provides uniform or other site specific distribution of fluids about the bio-mat of a wastewater disposal area, with lateral spacing and hole spacing varying based on the type of disposal area being utilized. The lateral system can also be utilized to provide continuous low volume air supply system to a wastewater disposal area or peat filter module. The air lateral installation includes methods to minimize airflow disturbance of the soil and methods to prevent air leakage.

8 Claims, 6 Drawing Sheets

(56) References Cited

U.S. PATENT DOCUMENTS

| | | |
|---|---|---|
| 7,465,390 B2 | 12/2008 | Potts |
| 7,744,759 B1 | 6/2010 | Potts |
| 2003/0070985 A1 | 4/2003 | Potts |
| 2003/0084693 A1 | 5/2003 | Sower |
| 2003/0172697 A1 | 9/2003 | Sower |
| 2003/0173293 A1 | 9/2003 | Potts |
| 2004/0003535 A1 | 1/2004 | Wiese et al. |
| 2004/0190994 A1 | 9/2004 | Rossabi et al. |
| 2004/0195159 A1 | 10/2004 | Potts |
| 2004/0195177 A1 | 10/2004 | Potts |
| 2005/0269253 A1 | 12/2005 | Potts |
| 2005/0284811 A1 | 12/2005 | Potts |
| 2006/0042526 A1 | 3/2006 | McLeod |
| 2006/0182497 A1 | 8/2006 | Potts |
| 2006/0272988 A1 | 12/2006 | Potts |
| 2007/0089888 A1 | 4/2007 | Condrey |
| 2007/0125561 A1 | 6/2007 | Depault |
| 2007/0237583 A1 | 10/2007 | Corwon et al. |
| 2008/0073259 A1 | 3/2008 | Potts |
| 2008/0156725 A1 | 7/2008 | Ogden |
| 2008/0187400 A1 | 8/2008 | Kossowan et al. |
| 2008/0202999 A1 | 8/2008 | Potts |
| 2008/0203002 A1 | 8/2008 | Potts |
| 2008/0240862 A1 | 10/2008 | Kossowan |
| 2009/0051057 A1 | 2/2009 | Kim et al. |
| 2009/0071884 A1 | 3/2009 | Potts |
| 2009/0272689 A1 | 11/2009 | Ladouceur |
| 2010/0102139 A1 | 4/2010 | Hursen |
| 2010/0140188 A1 | 6/2010 | Potts |
| 2010/0178112 A1 | 7/2010 | Potts |
| 2010/0283163 A1 | 11/2010 | Abello et al. |
| 2011/0101548 A1 | 5/2011 | Kim et al. |
| 2011/0133348 A1 | 6/2011 | Kim et al. |

\* cited by examiner

TOP VIEW

SYSTEM FOR ENHANCED AEROBIC ACTIVITY AND BIO-MAT CONTROL FOR ONSITE WASTEWATER DISPOSAL

CROSS-REFERENCE TO RELATED APPLICATION

This application is a continuation of U.S. application Ser. No. 13/218,758, filed on Aug. 26, 2011, now U.S. Pat. No. 8,974,670, which claims priority to U.S. Provisional Application No. 61/377,178, filed Aug. 26, 2010, the contents of which are incorporated by reference herein.

FIELD OF THE INVENTION

This invention relates to enhance aeration of an onsite wastewater disposal area located after a primary treatment (settling tank/septic tank/aerobic tank).

BACKGROUND OF THE INVENTION

A typical septic system includes a septic/aerobic tank or septic/aerobic tank and pump tank where primary treatment of wastewater takes place. The effluent wastewater then flows to a disposal area, buried in the soil, for secondary treatment and disposal into the ground. In conventional septic systems, the disposal area can include a disposal bed or trenches with stone and pipe laterals, or a disposal bed or trenches with infiltration chambers, or seepage pits. Secondary treatment of wastewater will typically naturally occur at the interface between the disposal area and the soil adjacent to or below the disposal area. This soil may be imported sand, native soil, or other locally permitted permeable material, and the interface between the disposal area and the soil is where the secondary treatment process of the wastewater takes place becomes a biological mat (bio-mat). The bio-mat should be typically be maintained in an aerobic state for long term operation of a wastewater disposal system to occur. Where aerobic conditions are not typically maintained, the bio-mat will thicken much more quickly and failure of the disposal area will result quicker than a typical aerobic state disposal bed.

In normally functioning septic disposal areas, the wastewater is naturally and microbiologically processed as it passes through the bio-mat and subsurface fill material (or native soil) by aerobic and anaerobic bacteria and microorganisms (bugs). The top few inches of sand or soil develop into a bio-mat which bugs and other bacteria which helps digest the wastewater. These bugs will be both combination of aerobic and anaerobic organisms. The effluent of a septic tank contains substantial anaerobic bacteria, and unless the disposal area is maintained in an aerobic state, the anaerobic bugs will flourish and the bio-mat will tend to thicken and the disposal area will clog prematurely with anaerobic sludge.

Adequate air is typically available to supply aerobic bacteria with oxygen at the bio-mat interface of the secondary treatment area, since a typical disposal area is shallow and covered with grass which is a pervious material. If the disposal area is affected by site specific conditions which do not allow for a shallow disposal bed covered with grass, anaerobic condition can occur. For example, the site specific conditions may include, but are not limited to, the disposal area is too deep in the ground, or underneath parking areas which prevent adequate oxygen from reaching the disposal bed; and/or the disposal area is influenced by leaky plumbing fixtures and/or by surface or subsurface groundwater conditions that hydraulically overload the disposal bed beyond the hydraulic conductivity of the bio-mat.

The bio-mat for a septic system will typically remain adequately permeable for 10-40 years. In cases where disposal areas are adversely affected by one of the above, anaerobic conditions can occur in the disposal area and resultant premature failure of the disposal area can occur in less than 10 years.

It is known that the biochemical processing of wastewater is enhanced by flowing air or other active gas through secondary wastewater treatment processes, and the temperature of the aerobic environment will affect the aerobic activity rate. Typically, the air flows to or from auxiliary pipes in the soil run parallel to and spaced apart from perforated lateral pipes so that the air can flow to or from the wastewater distribution laterals. The auxiliary pipes are either evacuated or pressurized relative to induce aeration of the surrounding area. Disposal areas aeration technology can be applied to new installations or retrofitted onto old installations. The subject invention improves this known process, specific to onsite wastewater disposal, by allowing multiuse lateral installations under and within the zone of treatment of a secondary treatment area following a septic tank to provide rejuvenating properties and continuous/intermittent long term aeration through the multiuse permanent installation laterals for air/fluid airwashing, backwashing, and long term aeration maintenance. The subject invention results in the ability to maintain a secondary treatment/disposal area indefinitely by allowing cleaning out of treatment/disposal areas by locally licensed waste haulers, therefore minimizing environmental impacts of mining activities, and minimizing hazardous disposal volumes at local landfills for contaminated soil typically removed from septic disposal systems. Licensed waste haulers typically deliver the liquids and solids to local wastewater treatment facilities for tertiary treatment and ultimate disposal per state and local requirements.

Proper disposal area performance can be affected if the soil layer is thicker or less permeable over the leaching system. This will lead to a rise of anaerobic bacteria in the bio-mat and a potential environmental hazard when the disposal area fails and surfacing of effluent on the ground, or backup of plumbing occurs.

In some disposal area installations, the soil is topped by a bituminous pavement or analogous material which is vastly different from soil, and which pavement has either limited permeability or uneven permeability, due to changes thickness, density, cracks, and so forth.

Thus, there is a need to provide a system to be able to maintain aerobic conditions in the disposal area and the bio-mat, specifically where the system properly aerates the bio-mat. Typically, previous aeration technology involves aeration of the disposal area by pressurization of the disposal area from above the bio-mat, this technology does not significantly improve the aerobic condition of the soil beneath the bio-mat where aerobic bacteria need to survive for long term operation of the disposal area. The present invention results in aerobic conditions beneath thin aerobic conditions where previous technology does not. The aerobic conditions are variably maintained by controlling the amount of air and hence, oxygen flow is regulated with automatic or manual on off operation of the blower. The blower aerates the soil bio-mat interface from below and as the air rises to the atmosphere, the oxygen in the air allows aerobic bacteria to thrive on either side of the bio-mat for sewage disposal systems.

SUMMARY OF THE INVENTION

The present invention is utilized for controlling and maintaining the aerobic environment under septic disposal areas, allowing for rejuvenation of clogged disposal areas, and providing enhanced aerobic activity in the disposal areas with restricted aerobic activity and/or limited permeable surface above the secondary treatment areas. This invention allows for low rate aeration, and high rate air washing and fluid backwashing of functioning and malfunctioning sewage disposal installations which effectively rearranges, mechanically cleans and restructures the soil to allow permeability to be restored and maintained in the subsurface soil. In some instances, natural silica, sand or other benign durable natural spheroidal objects may be added during backwashing operations to improve the permeability of the soil.

The present invention is a system which prolongs the life of a disposal area under a limited permeable environment, as well as corrects defective existing systems by providing high quantities of air flow to both sides of the disposal area bio-mat, which will provide enhanced biological activity to reduce the bio-mat thickness, biologically remove sludge, and provide long term low air flow/or other fluids and additives to the zone of treatment, thereto to promote proper biochemical performance for an optimal and sustainable bio-mat thickness that allows adequate permeability and provides enhanced wastewater quality to the local aquifer. Additionally, the air may be heated to provide a warm air flow to warm up the bio-mat for enhanced aerobic activity.

The present invention does not pressurize the disposal area. The air flows opposite to the direction of the wastewater. The present invention is installed in site specific bored horizontal holes, and at moderate depths greater than about 8 inches below the bio-mat interface, preferably between about 8 inches to about 24 inches below the bio-mat interface. Additionally, laterals can be placed greater than about 8 inches from the perimeter of the bio-mat interface.

The present invention provides an aeration lateral system designed to be site specific for retro fitting to existing septic disposal areas, or as a new installations, to be a permanent intermittent air/fluid washing and intermittent or continuous low volume air or low volume heated air supply system to periodically break up the biological clogging mat at the interface of the disposal area and imported sand, or native soil fill under the disposal area. The lateral system is designed to provide site specific distribution of air/fluids to the wastewater disposal area, with lateral spacing and air hole spacing varying based on the operating conditions, type and size of disposal area being utilized. Retrofit lateral installations are performed by boring holes under the disposal area and installation of the laterals into the bored holes.

The present invention provides a system to enhance aerobic activity and bio-mat control for new or existing septic disposal areas with limited permeable surfaces thereabove. The system includes a wastewater zone of treatment located underneath a limited permeable surface; a series of aeration laterals having tapered diffuser holes therethrough to provide for even air distribution therethrough, the series aeration laterals extending about a bio-mat, the tapered diffuser holes have an inside diameter and an outside diameter, the inside diameter is smaller than the outside diameter; and a manifold attached to the pipes providing a fluid to the series of aeration laterals. The fluid can be air and heated air. The system can further include a pump connected to the manifold to provide a flow of the air through the manifold. The system can include a vent pipe attached to the zone of treatment to allow air to escape from the zone of treatment.

The present invention further provides for a system to enhance aerobic activity and bio-mat control for new and existing leaching fields. The system includes at least one wastewater disposal lateral extending from a septic tank into a seepage pit, disposal field, or infiltration chamber above a zone of treatment; at least one aeration lateral extending within the zone of treatment, the at least one aeration lateral is an elongated pipe having a sealed end and an attached end, the attached end is attached to a conduit supplying pressurized air therethrough, the elongated pipe including a series of spaced apart tapered diffuser holes to allow air to escape therethrough; and an air supply source attached to the at least one aeration lateral to provide positive air pressure through the at least one aeration lateral for airwashing and aerating said zone of treatment. The system can further include a vent pipe connected directly to the zone of treatment and extending above ground to provide venting to the atmosphere. The air supply source can be a compressor, and the compressor passively heats the pressurized air and supplies the pressurized air to the at least one aeration laterals. The distance between each diffuser hole can increase from the sealed end to the attached end to provide air distribution along the length of the pipe. Further, the system can include a subsurface vault constructed of reinforced concrete, steel, fiberglass or polyvinyl chloride to house the air supply source therein. Additionally, a vent can supply air into the subsurface vault and into the air supply source. At least one aeration lateral extends through the zone of treatment below the disposal area to aerate a bio-mat, and the aeration laterals including tapered diffuser holes therethrough for distribution of air to the bio-mat.

Further, the present invention includes a method of aerating a bio-mat, including the steps of supplying air to an air supply source; compressing air through the air supply source; passively heating the air as air is compressed; supplying heated air to a series of aeration laterals having tapered diffuser holes therethrough to provide for even air distribution therethrough, the series aeration laterals extending about a bio-mat, the tapered diffuser holes have an inside diameter and an outside diameter, the inside diameter is smaller than the outside diameter; and expelling air from the aeration laterals through the tapered diffuser holes, the air flowing from the zone of treatment vertically upwards to the bio-mat to aerate the bio-mat.

DETAILED DESCRIPTION OF THE INVENTION

FIGS. 1-12 show an aeration system 50 of the present invention for disposal areas.

Figure 1:
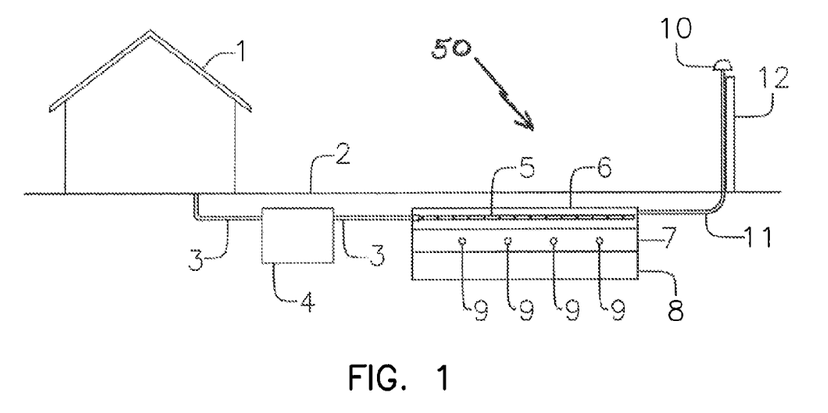
FIG. 1 is a schematic of a system formed in accordance with the subject invention.

FIG. 1 shows septic system with a method for enhanced aerobic activity for a disposal area 6. A disposal area 6 includes, but is not limited to, disposal bed, seepage pit and the like. The septic system includes a source 1 of wastewater connected to connection pipes 3 which are located below ground level 2. The source of wastewater fed to the disposal areas 6 can be from a variety of sources as know in the art. The wastewater includes any known wastewater, such as storm or sewer water as known in the art. The connection pipes 3 connect the source 1 of the wastewater to a primary treatment septic tank and/or aerobic treatment and/or pump tank 4. The connection pipes 3 also connect the tank(s) 4 to wastewater disposal laterals 5 which are perforated lateral pipes or infiltration chambers which allow the wastewater to escape to the disposal area 6. The wastewater disposal laterals 5 can be surrounded by crushed stone to allow for the wastewater to percolate through the stone and into the zone of treatment 7. The zone of treatment 7 is the area where both biological breakdown and mechanical filtration system occurs. Alternatively, when using infiltration (hollow) chambers, stone is not necessary and wastewater leaches into the soil below. Bio-mat formation occurs at the bottom of the stone or infiltration chamber at the soil interface at the top of the zone of treatment 7. This zone of treatment 7 provides secondary treatment of the wastewater for traditional septic systems. The improved aeration system 50 includes at least one aeration lateral 9 installed within the zone of treatment 7 and surrounded by imported sand or native soil to deliver fluid to the zone of treatment 7. The fluid can include air, other gases, liquids or combinations thereof. The effluent wastewater from primary treatment tank(s) 4 enters the disposal area 6 through connecting pipe 3 and is distributed in the disposal area 6 by the wastewater disposal laterals 5 and is distributed in the disposal area 6 downward through the crushed stone into the zone of treatment 7 and into the zone of disposal 8, the wastewater is considered benign and environmentally safe for introduction into the environment. The zone of treatment 7 and zone of disposal 8 may be imported sand or native soil. FIG. 1 further shows a ventilation pipe 11 which extends from the crushed stone 6 to the atmosphere. The ventilation pipe 11 includes a ventilation port 10 which is a minimum of about 24 inches above ground 2 (or as dictated by local building codes and to be above typical maximum snow depth). Additionally, a ventilation support 12 is supplied to support the ventilation pipe 11.

Figure 2:
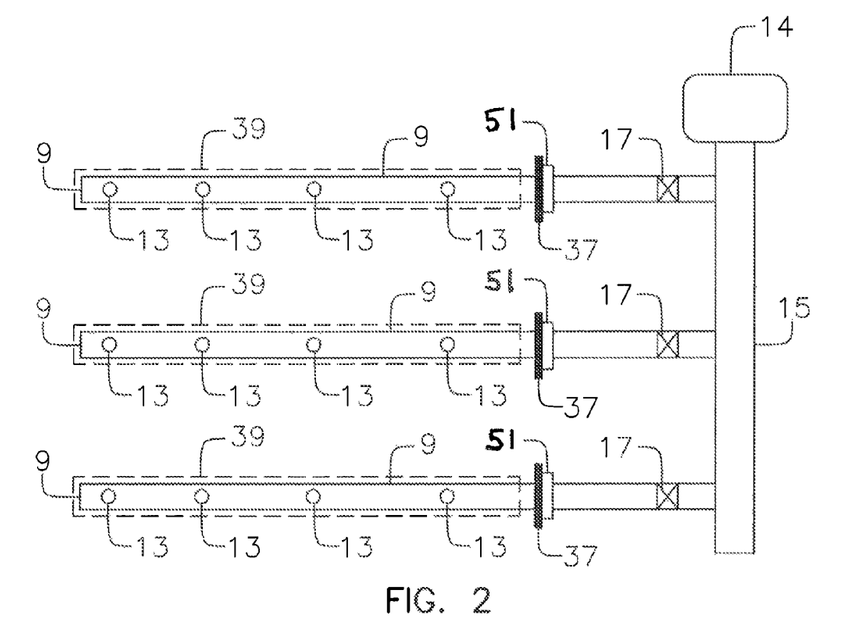
FIG. 2 is a schematic of an aeration system formed in accordance with the subject invention.

FIG. 2 shows the aeration laterals 9 attached to a manifold 15 and air supply pump enclosure 14 attached extending from the manifold 15. The air supply pump enclosure 14 includes a blower, compressor, air supply member mounted therein. The air supply pump enclosure can be a subsurface vault which is designed to preferably warm the air a minimum of about 20 F degrees above ambient conditions at the discharge, and supply long term continuous or intermittent warmed air supply through the diffuser holes 13 below the bio-mat at a maximum orifice outlet pressure of 12.5 psi to prevent fracturing of soil. The aeration laterals 9 include a series of perforated pipes which provide warmed air or other gases continuously or intermittently as necessary to the zone of treatment 7 to enhance aerobic activity, for the purpose of bio-mat reduction and control. The aeration laterals 9 are made from PVC or other plastic piping and range in diameter from about ½" to about 4". The length of the aeration laterals 9 depend on the size and operating condition of the disposal area 6. The aeration laterals 9 are preferably located directly below the bio-mat in the zone of treatment 7. The diffuser holes 13 are sized and designed with a chamfer to more evenly distribute air under the bio-mat, and prevent soil fracturing at pressures up to about 12.5 psi. The diffuser holes 13 are tapered at about a 45° angle through the thickness of the pipe with a diameter of about 0.25 inches to diffuse the air flowing therethrough. The diffuser holes 13 are separated about the circumference at 90 degrees from each other. The air can be applied at a high rate for airwashing so that airflow upwards perpendicular to the biological clogging mat is performed at a periodic rate sufficient to lift and/or break up the clogged soil bio-mat interface. Alternatively, air can be supplied at a continuous or intermittent lower rate to warm the environment of the bio-mat and provide sufficient oxygen facilitate the growth of aerobic microorganisms in the zone of treatment 7. The air rate is site specific based on hydraulic loading rate, soil permeability, and quality of wastewater.

Figure 8:
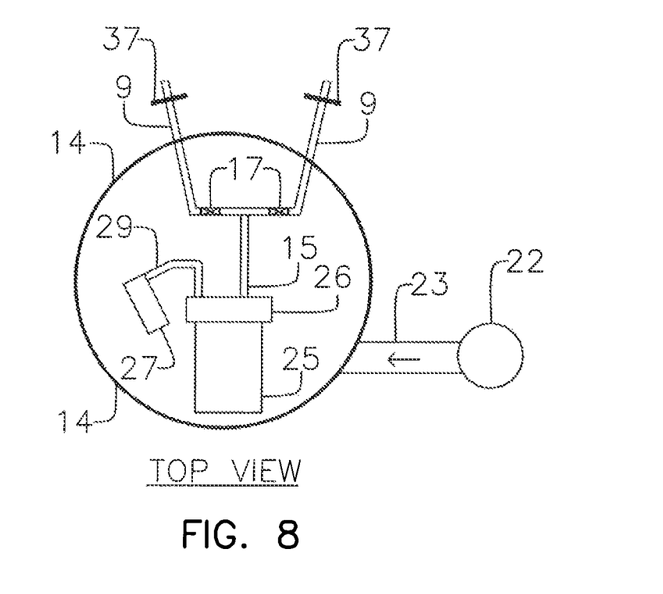
FIG. 8 is a schematic of a subsurface blower installation formed in accordance with the subject invention
Figure 9:
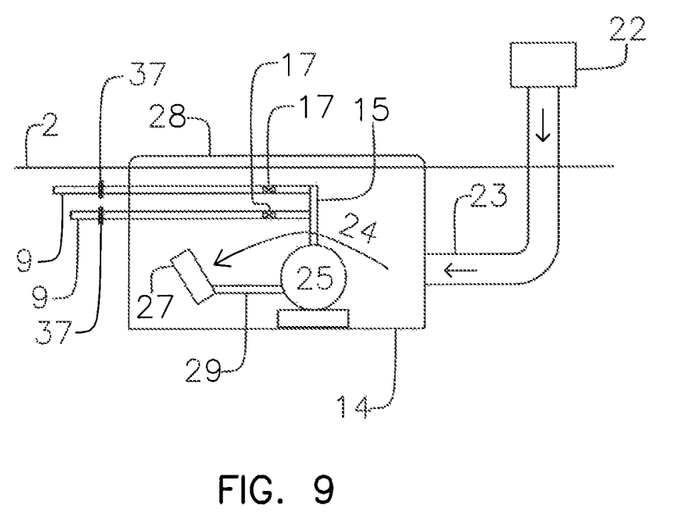
FIG. 9 is a cross section of a subsurface blower installation formed in accordance with the subject invention.

The air flow rate through the aeration laterals 9 is controlled to maintain an orifice outlet pressure preferably below about 12.5 psi during airwashing operations to prevent fracturing of the soil, and air pressure is preferably maintained typically below about 2.5 psi during continuous or intermittent use for the purpose of warming the soil and controlling the thickness of the bio-mat. Each aeration lateral 9 can include an air control mechanism manual or automatic valve 17 to control and/or regulate to air flow through each aeration lateral, as shown in FIGS. 8 and 9. One end of the aeration laterals 9 is sealed off such that no air escapes with an anti-seep collar or boot 51. The other end of the aeration lateral 9 is attached to a manifold 15. The manifold 15 is typically a larger diameter pipe made from the same materials as the aeration laterals 9. The manifold 15 range in diameter between about 1 inch to about 10 inches. The manifold 15 can run perpendicular to the aeration laterals 9 or at an angle. One end of the manifold 15 is sealed off preventing air from escaping therefrom. The other end of the manifold 15 has a compressor, blower, or other air supply attached thereto. The air supply source provides air through the manifold 15 and aeration laterals 9 and out the diffuser holes 13. The air supply source can be located above grade or underground. The air supply source pressurizes the system to various pressures based on whether the aeration system 50 is being utilized for airwashing purposes or for continuous or intermittent low air flow rates to maintain aerobic performance of the disposal area system. Preferably, airflow rates for air/fluid washing is about 1-5 cubic feet per minute per square foot of disposal area system bio-mat area. Low flow to maintain aeration in the disposal beds is about 0.001 to about 0.01 cubic feet per minute per square foot of disposal area system bio-mat area.

FIG. 2 also shows an airtight rubber or other flexible gasket 37 can be installed around the aeration lateral 9 to prevent the leakage of air. An air diffuser 39 can be installed to assist with diffusing the air and preventing the diffuser holes 13 from clogging with soil. The air diffuser 39 extends about the exterior of each of the aeration laterals 9. The air diffuser 39 can be a textile material formed into a woven, knitted, braided, mesh, or netted configuration. The air diffuser 39 can be a formed from natural or synthetic fibers such as a woven cloth or polymeric mesh.

Figure 3:
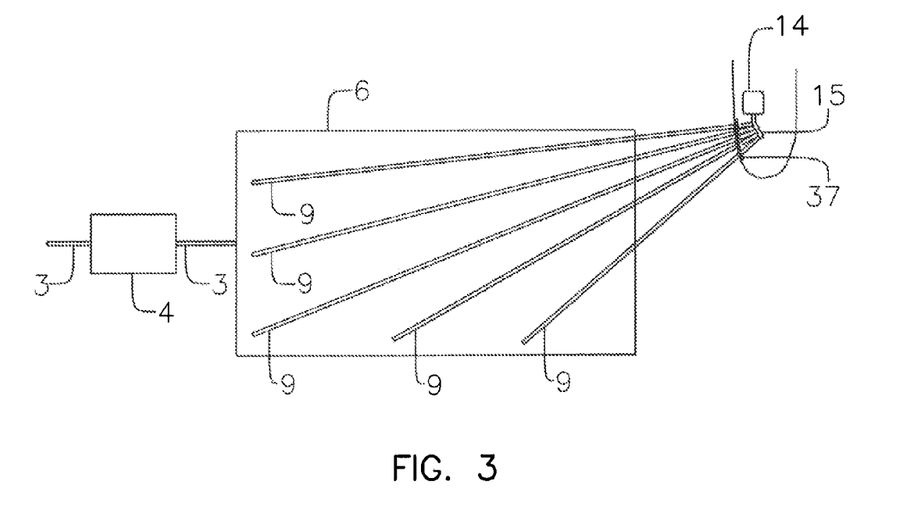
FIG. 3 is a schematic of a retro-fit aeration system in a parking lot for a disposal bed formed in accordance with the subject invention.

FIG. 3 shows an alternative embodiment which is similar to the aeration system 50 shown in FIGS. 1 and 2 but the aeration laterals 9 extend at an angle, fanning out into the zone of treatment 7. Additionally, the manifold 15 and the air supply are in a subsurface enclosure 14. This allows for easy access to the air supply source for airwashing/backwashing which includes increasing air/fluid pressure through the aeration laterals 9 for a specific time frame to allow for break-up of sediment for malfunctioning systems. Various gaseous/fluid transfers or other additives may be used in conjunction with this system. For example, a backwash pump may be used instead of the air compressor to allow for liquid fluid transfer through the aeration laterals 9 to clean out/treat/remove/break-up sediment. The use of locally licensed waste hauler will be required to remove any wastewater contaminated fluids or solids as a result of the air/fluid backwashing materials.

Figure 4:
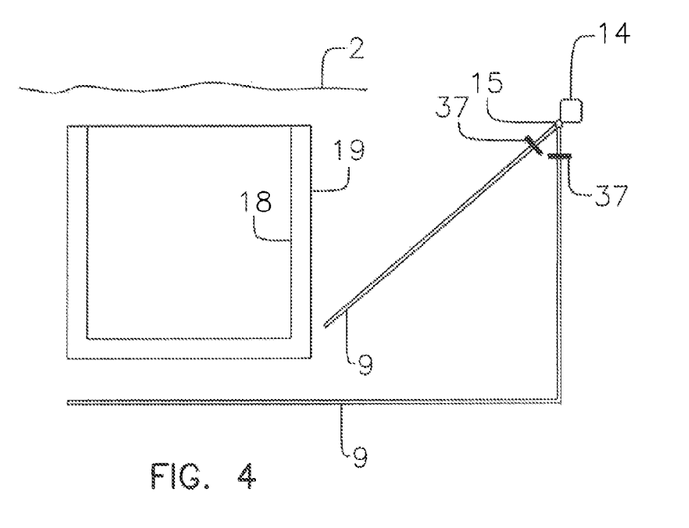
FIG. 4 is a schematic of an aeration system for a seepage pit disposal area formed in accordance with the subject invention with air and backwashing lateral adjacent to and under a seepage pit.

FIG. 4 shows a seepage pit 18 surrounded by crushed stone 20. A seepage pit 18 can be constructed with concrete, masonry block, or stone, and has holes or gaps that allow wastewater to permeate through the side walls and bottom of the seepage pit 18 which develops a bio-mat and eventually ceases to operate as the bio-mat thickness grows over time. Two aeration laterals 9 are shown, although the number of laterals will be site specific based on site constraints, thickness of bio-mat, quantity and quality of wastewater. One or more aeration lateral(s) 9 extends directly under the seepage pit 18 and parallel thereto. The other aeration lateral 9 extends at a diagonal and ends at the crushed stone 20.

Figure 5:
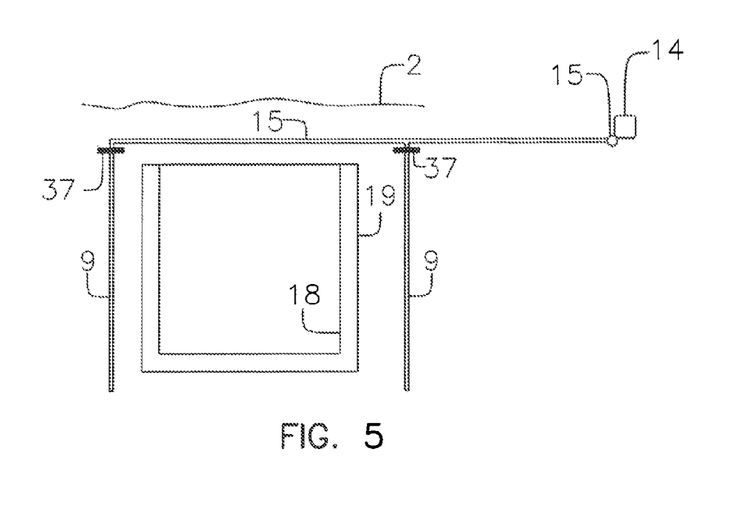
FIG. 5 is a schematic of an aeration system for a seepage pit disposal area system formed in accordance with the subject invention with vertical air and backwashing lateral adjacent a seepage pit.

FIG. 5 shows a seepage pit 18 which is surrounded by crushed stone 20. A seepage pit 18 can be constructed with concrete, masonry block, or stone, and has holes or gaps that allow wastewater to permeate through the side walls and bottom of the seepage pit 18 which develops a bio-mat and eventually ceases to operate as the bio-mat thickness grows over time. Two aeration laterals 9 are shown extending vertically along the side perimeter of the seepage pit 18, although the number of aeration laterals 9 will be site specific based on site constraints, thickness of bio-mat, quantity and quality of wastewater. The aeration laterals 9 are a distance of greater than about 8 inches from the outside sidewalls perimeter of the seepage pit 18 to allow for proper aeration of the wastewater.

Figure 6:
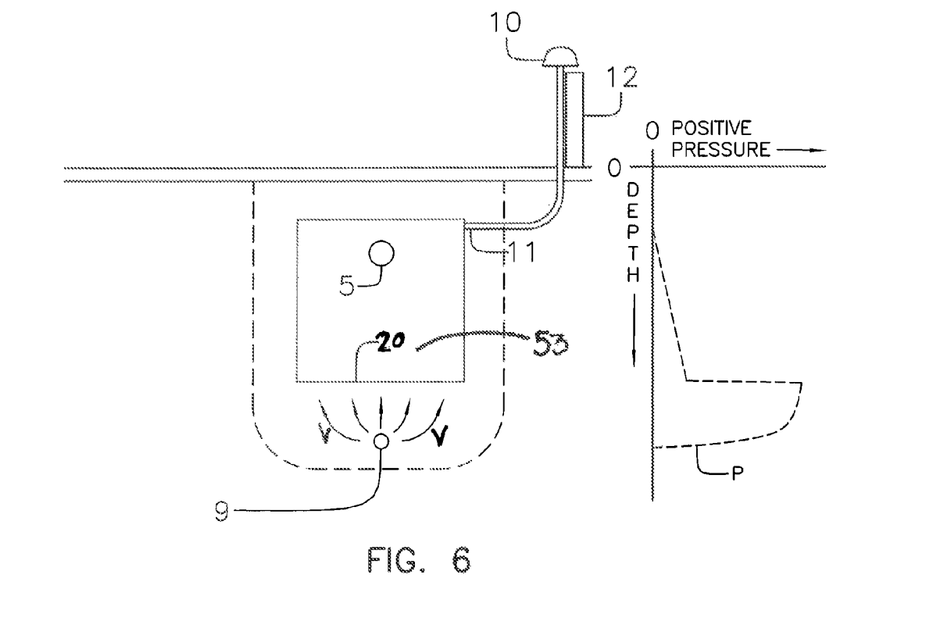
FIG. 6 is a schematic of a system for a disposal bed under a parking lot or other impervious surface formed in accordance with the subject invention.

FIG. 6 is the aeration system 50 of FIG. 1 in use for a less permeable, impervious ground surface like a parking lot or pavement where the ground surface is not capable of transferring air from the atmosphere to the soil below the impervious surface 19. FIG. 6 shows wastewater disposal laterals 5 surrounded by crushed stone 20. The ventilation pipe 11 is directed connected to the crushed stone 20 to eliminate air pressure above the point of connection. The ventilation pipe 11 extends from one side of the crushed stone 20 out to the atmosphere. The ventilation pipe 11 is capped with a ventilation port 10. The ventilation pipe 11 is made from PVC piping and ranges in size from 2 inches to 12 inches based on the size of the disposal bed 53, and quantity of airflow. The ventilation pipe 11 is not pressurized as it is open to the atmosphere. Additionally, the wastewater disposal laterals 5 only supplies wastewater. Under normal circumstances, the wastewater disposal laterals 5 is not under any additional pressure and does not mix with air by aeration piping or a compressor. The aeration lateral 9 is parallel to, adjacent, aligned and directly under the wastewater disposal laterals 5. The aeration lateral is spaced apart from the crushed stone 20 and the wastewater disposal laterals 5 to allow for natural migration and expansion of the air from the aeration lateral 9 through the sub-ground as shown by vectors V. Vector V shows the direction of the air flow through the soil. The aeration laterals 9 may be installed below the groundwater elevation. The aeration laterals 9 are typically placed 6 inches to 3 feet under the bio-mat. The aeration laterals 9 are always under pressure to allow air to be pumped through the system and out the diffuser holes 13. FIG. 5 shows the pressure curve in the soil. The highest amount of pressure (P) is at the point of air flow from the aeration laterals 9. The pressure curve shows that the air pressure decreases as the air disperses through the soil and the crushed stones 20. The air is vented through the ventilation pipe 11 and the air is released to atmosphere which eliminates the air pressure above the ventilation pipe 11, as shown by the pressure curve.

Figure 7:
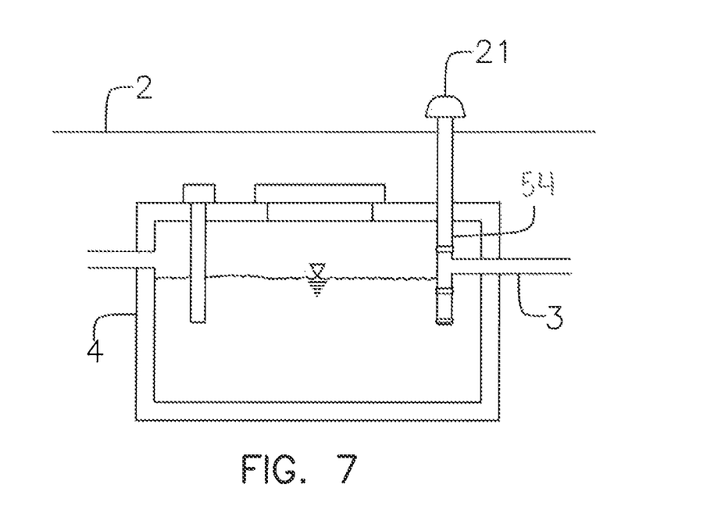
FIG. 7 is a schematic of sealing a septic tank outlet baffle formed in accordance with the subject invention.

FIG. 7 illustrates a method of sealing a septic tank outlet baffle 54 to prevent escape of air and odor problems. The inlet baffle does not typically need modification when this invention is installed. The outlet baffle 54 is manufactured with PVC or other plastic pipe and is capped to prevent escape of air and odors from the septic tank during the aeration process. The vent cap 21 is a mushroom vent cap is similar to Polylok's Polyair™ Activated Carbon Vent Filter which is removable to allow access to the outlet pipe 3 from the primary treatment tank 4. Outlet pipe 3 must be sealed during periodic maintenance of the disposal bed with high volume air to prevent air from entering into and pressurizing the primary treatment tank. The primary treatment outlet baffles 54 act as a removable odor control vent to prevent pressurizing the septic tank when the air is introduced into the disposal area 6.

FIGS. 8 and 9 illustrate the air supply pump enclosure 14 which is constructed of high density non-corrosive polyethylene plastic, and has an insulated lid 28 to increase thermal heating efficiency, and has the highest ultraviolet light protection available such as the Polylok™ Inc. 3008 series sump basin. The air supply blower is a regenerative turbine design sized to provide adequate air and discharge pressure for each particular installation, similar to Fuji Electric VFC series regenerative turbine blowers. The air suction line is protected from the precipitation by a mushroom vent 22 and suction pipe 23 are properly sized to provide proper cooling to the thermally protected totally enclosed fan cooled motor 25 of the regenerative turbine pump 26. This air supply source supplies pressurized heated air to the manifold 15 and aeration laterals 9 of the installation. The air 24 is designed to travel across the motor surface to help cool the motor prior to entering the air intake filter 27 and suction line 29 at approximately 180 degrees orientation in the subsurface insulated enclosure with airflow across the motor 25. The air intake takes the heated (motor cooling air) air from the enclosure and after compression and acceleration through the turbine housing, becomes further heated by the adiabatic process (otherwise known as heat of compression) by 10 to 50 degrees F. before entering the manifold 15, and aeration laterals 9. This heated air acts to heat the disposal area bio-mat and enhance aerobic activity in the bio-mat.

Figure 10:
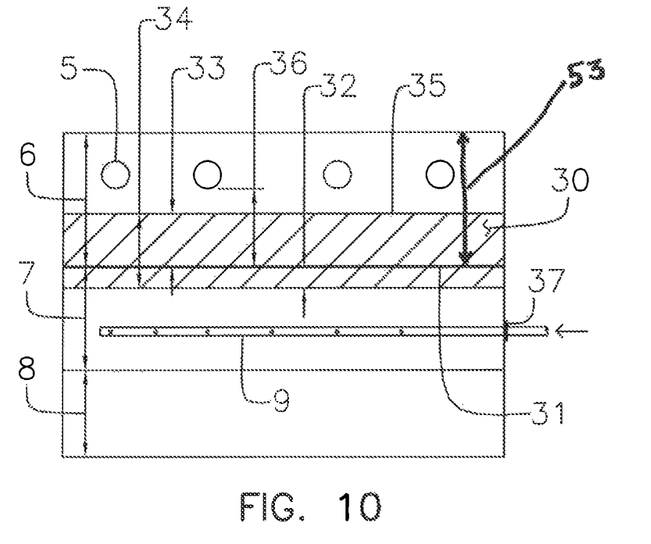
FIG. 10 is a schematic top view of a bio-mat relative to a disposal bed installation formed in accordance with the subject invention.

FIG. 10 illustrates the bio-mat thickness for a disposal bed 53 treatment. FIG. 10 shows the level of infiltration interface 31 is located between the stone and the soil subgrade at the top of the zone of treatment 7. The level of infiltration interface 31 is where an organic mat of aerobic and anaerobic bacteria will form the bio-mat 30 which acts as a limiting factor for infiltration. The infiltration rate of the disposal area 6 is governed by the infiltration rate of this bio-mat barrier which will determine the long term acceptance rate (LTAR) of the disposal area 6. The LTAR will decline over time as a typical increase in bio-mat 30 thickness will occur based on the characteristics of the wastewater, and the characteristics of the soil in the zone of treatment 7. The bio-mat 30 formation will extend upwards a distance 33 into the stone of the disposal area 6 to the approximate level of high water elevation of the disposal area 6. The operating condition of a disposal area 6 can be monitored by the high level elevation 33 and thickness 34 of the bio-mat 30. See *Spreadsheet For Estimating Long Term Acceptance Rate For On-Site Wastewater Systems In Georgia*, David E. Radcliff et al., Proceedings of the 2009 Georgia Water Resources Conference, April 2009, incorporated herein by reference.

A proper operating typical residential septic disposal area or bed has a bio-mat 30 thickness 34 of about 1 inch to about 2½ inches when sand is utilized in the zone of treatment 7, and the sand has a permeability of about 6 inches to about 20 inches per hour, and the hydraulic loading rate to the disposal area size under 2 gallons per square foot of disposal area per day, and the disposal area has a septic tank sized preferably at a minimum of about 150% of the daily flow rate from the dwelling unit prior to discharge into the disposal area.

The level of infiltration 31 of the wastewater for a disposal area 6 is at the bottom of the disposal area 6 and the top of the zone of treatment 7. The bio-mat 30 will begin to form at the level of infiltration interface 31 and the consistency and permeabilty rates of the bio-mat 30 can vary substantially based on hydraulic loading rate, the composition of the wastewater, and the type of soil in the zone of treatment 7, and the subsurface groundwater level. Under normal operating conditions, the bio-mat 30 formation will extend down into the zone of treatment 7 at a distance 32 below the level of infiltration 31 of about 0.5 inch to about 1.0 inch; and the bio-mat 30 formation will extend upwardly above a distance 33 above the level of infiltration 31 of approximately about 0.5 to about 1.5 inches to the top 35 of the bio-mat 30. The total thickness 34 of a bio-mat 30 is about 1.5 inches to about 2½ inches. Based on the hydraulic conductivity of the bio-mat 30, the hydraulic loading rate to the disposal area 6, and the type of soil in the zone of treatment 7, and the groundwater elevation, failure of the disposal area 6 will ultimately result when the water level in the disposal area 6 becomes equal to or higher than the distance between bottom of the laterals and the level of infiltration 31 (shown as distance 36). This causes a backup of the plumbing which is about 10 to about 40 years after the initial installation of the septic disposal area based on the quality of wastewater and the type of soil in the zone of treatment 7. Failure of the disposal area 6 can occur between about 1 to about 10 years where insufficient aeration of the disposal areas 6 results in anaerobic conditions at the level of infiltration 31.

Figure 11:
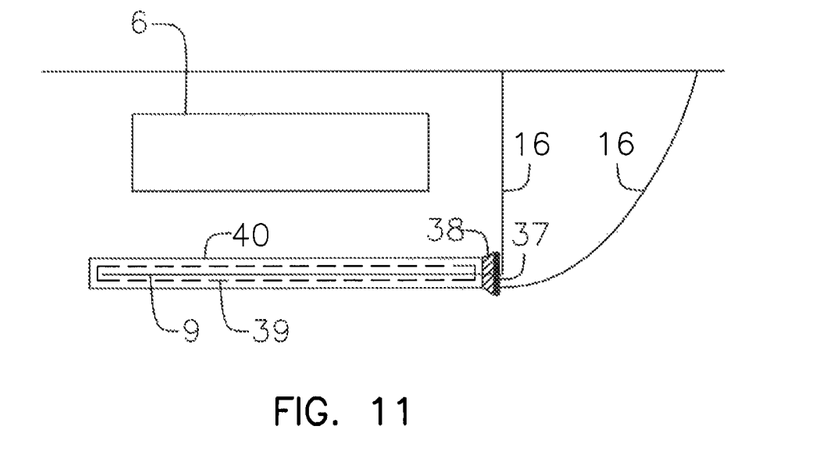
FIG. 11 is a schematic of a horizontal borehole and methods of preventing air leakage through soil relative to a disposal bed installation formed in accordance with the subject invention.

FIG. 11 is a schematic of the horizontal borehole 40, the woven cloth air diffuser 39 and the methods of preventing air leakage through soil. When installing a borehole 40 under a disposal area 6, temporary excavation 16 is necessary to lower the boring equipment to the proper elevation. Unless precautions are taken, air leakage will occur through end of the lateral 9 and through the soil in the temporary excavation. An airtight rubber or other flexible gasket 37 can be installed around the lateral to prevent the leakage of air out of the borehole 40. Prior to installation of the gasket 37, the end 38 of the borehole 37 should be properly compacted, or filled with airtight foam or other sealant behind the gasket 37. The air woven cloth air diffuser 39 should be installed so that the end of the cloth does not pass through gasket 37. The temporary excavation 16 must be properly compacted to further prevent any air loss out of the ends of the aeration lateral 9.

Figure 12:
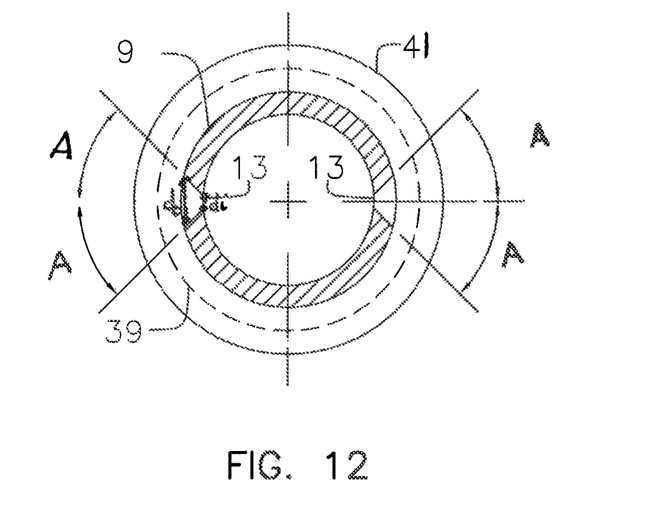
FIG. 12 is a schematic of a lateral air discharge holes diffusers formed in accordance with the subject invention.

FIG. 12 is a cross sectional view of a lateral 9 showing the geometric shape of the diffuser hole 13 through the thickness of the lateral and the woven sock diffuser 39 extending about the lateral 9. The diffuser hole 13 is tapered to provide lower air velocity and pressure than a hole with no taper. The inside diameter $d_i$ of the diffuser hole 13 is smaller than the outside diameter $d_o$.

The amount of air existing the diffuser hole 13 of the laterals 9 will be based on airflow equations. By increasing the hole size ($d_i$ and $d_o$) adjacent to the lateral 9 and soil interface 41, a taper of the diffuser hole 13 provides the same quantity of air at a lower pressure at the soil lateral interface 41. The installation of the woven sock diffuser 39 further diffuses the air and further protects the soil in the zone of treatment 7 from fracturing due to high pressures and high airflow velocities.

Preferably, the orifice sizing of the diffuser holes 13 is about ¼" diameter hole on the interior of the pipe or inside diameter $d_i$; and preferably about ½" at the outside of the pipe or outside diameter $d_o$. The diffuser hole 13 can be larger depending on the width and length of the lateral 9 used. The opening of the diffuser hole 13, is tapered at a 45 degree angle A to diffuse the air and lower the velocity of the air against the lateral 9 and soil interface 41. The diffuser holes 13 are preferably spaced 180 degrees apart every 8 inches with adjacent holes 13 alternating 90 degrees every 8 inches to provide uniform airflow in the entire zone of treatment 7.

The aeration system 50 of the present invention may be installed for use with a septic disposal area 6 as a new or as a retrofit installation. The steps of installation for retrofit include digging a trench or access pit near the existing septic disposal area and boring holes beneath or into the zone of treatment. The boreholes may be horizontal, vertical, or directional to allow installation of permanent air laterals adjacent to and under existing disposal areas. The pipes are inserted into the bored holes which will serve as the aeration laterals. Install the air laterals parallel to the clogged soil interface with holes or other air diffusers releasing air perpendicular to the air lateral and perpendicular the clogged soil interface. The aeration laterals have a plurality of holes drilled therein and spaced apart at an interval that allows for uneven air distribution. Connect the aeration laterals together by a manifold fitted with pressure gauges. The manifold is typically constructed of PVC piping. A connection to a compressor is available to the manifold to allow for high rate air backwashing, and/or alternatively to connect a backwash pump to the manifold to backwash the disposal area. Water or other fluid backwashing is typically completed with clean water to flush out the bio-mat and gently expand the soil to allow for improved permeability, and is typically at a rate of 1.0 to 5.0 gallons per minute per square foot of bio-mat area, with careful consideration of site specific soils properties to maximize the flow but prevent expansion of the soil more than 5% or cause excessive channeling of the soil. To predict the amount of headloss anticipated by the backwash flowrate, from water treatment filter technology, several equations have been developed to describe the flow of clean water through a porous medium. Carman-Kozeny equation used to calculate head loss is as follows:

$$h = \frac{f(1-\alpha)Lv_s^2}{\phi\alpha^3 dg}$$

$$h = \frac{fp(1-\alpha)Lv_s^2}{\phi\alpha^3 d_g g}$$

-continued $$f = 150\frac{(1-\alpha)}{N_g} + 1.75$$

$$N_g = \frac{\phi d v_s \rho}{\mu}$$

where, h=headloss, m
f=friction factor
α=porosity
φ=particle shape factor (1.0 for spheres, 0.82 for rounded sand, 0.75 for average sand, 0.73 for crushed coal and angular sand)
L=depth of filter bed or layer, m
d=grain size diameter, m
$v_s$=superficial (approach) filtration velocity, m/s
g=acceleration due to gravity, 9.81 m/s$^2$
p=fraction of particles (based on mass) within adjacent sieve sizes
$d_g$=geometric mean diameter between sieve sizes $d_1$ and $d_2$
$N_g$=Reynolds number
μ=viscosity, N-s/m$^2$ The head loss and the backwash rate are related to the rate at which air or water is forced from below or adjacent to the bio-mat, and the head loss calculation is necessary to properly size the lateral diameter, and hole size, and the separation between holes. The backwash rate is typically much greater than the percolation rate of the soil. The backwash rate can be adjusted to allow for soil expansion as desired to restore permeability of overly compacted soils, soils clogged with biological or other deposits which limit the permeability rate.

The subsurface soil rise rate is the speed at which water rises up through the ground during backwashing. This is another way of measuring the backwash rate. During backwashing, the water pushes the subsurface soil up until it is suspended in the water. The height to which the media rises during backwashing is known as the subsurface soil expansion. For example, if the laterals are 24 inches deep beneath the bio-mat, during backwashing the soil may rise 1.2 inches during backwashing. This is a 5% subsurface soil expansion:

Subsurface soil expansion=((new Depth−Old Depth)/Old Depth)×100%

The step of connecting an air compressor or other air source to the laterals provides air backwash supply, at a rate which is site specific cubic feet per minute of air (about 0.5 to about 5 cfm per sq ft) per square foot of disposal area, to temporarily break up the clogged surface. Airwashing is typically necessary prior to completion of water or other fluid backwashing to prevent channeling of soils. Addition of optional chemicals, and/or aerobic bacteria as allowed by local rules and regulations to aid in the reduction anaerobic biomass formation and creation of a healthy aerobic disposal system may be utilized in site specific instances. The laterals can also be utilized for continuous or intermittent low rate of air, water or other fluids through the laterals to facilitate aerobic organisms to thrive in the disposal area, or aid in soil permeability remediation efforts as necessary. In some instances, natural silica sand or other benign natural spheroidal objects may be added during backwashing operations to improve the permeability of the soil.

The aeration system of the present invention may be installed for a new septic system. The steps of installation include installing of aeration pipes in the zone of treatment, installation of a boot for sealing the pipe and preventing leakage of air and fluids, connecting the aeration pipes to a manifold with pressure gauges for each aeration line, and connecting a pump to the manifold to provide constant or intermittent airflow to the septic system.

In either retrofit or new installations, venting of the clean stone, seepage pits and/or infiltration chambers shall be through a special vent one-way vent mounted above or on the septic tank outlet or at a job specific preferred location such as adjacent to shrubs or other landscape, on a tree, light pole, or through a peat filter. Installation of the vent system prevents pressurization of the disposal area to less than 8 inches of water column, or as required by site specific (septic tank effluent baffle depth, etc.) requirements. The vent is sized and designed to prevent the need for an aerobic interface between the stone and the ground surface above, therefore allowing disposal areas to better operate under paved parking lots and other impervious or nearly impervious building construction activities.

Periodic maintenance of the disposal areas includes monitoring the disposal efficiency of the disposal area and applying periodic high rate air introduction, low continuous, or other air flow adjustments to increase or maintain better efficiency of operation. Periodic maintenance also includes monitoring of biological activity of bacteria and other microscopic and larger organisms in the disposal area and can include reseeding the area with appropriate bacteria, other microbes or other organisms to reduce, grow, or maintain an appropriate biomass in the disposal area.

The invention being thus described, it will now be evident to those skilled in the art that the same may be varied in many ways. Such variations are not to be regarded as a departure from the spirit and scope of the invention and all such modifications are intended to be included within the scope of the following claims. Further, any of the embodiments or aspects of the invention as described in the claims may be used with one and another without limitation.

What is claimed is:

1. A system to enhance aerobic activity and bio-mat control for new or existing septic disposal areas located below a paved ground surface, the new or existing septic disposal areas including, below the paved ground surface, one or more wastewater disposal laterals surrounded by crushed stone, the system comprising:
a series of aeration laterals having tapered diffuser holes therethrough to provide for even air distribution therethrough, said aeration laterals extending below the crushed stone, said tapered diffuser holes each having an inside diameter and an outside diameter, said inside diameter being smaller than said outside diameter; and
a manifold attached to said aeration laterals providing a fluid to said aeration laterals,
whereby, said aeration laterals introduce fluid upwardly to the crushed stone.

2. The system according to claim 1, wherein said fluid is air.

3. The system according to claim 2, wherein said air is heated air.

4. The system according to claim 1, further including a pump connected to said manifold to provide a flow of said fluid through said manifold.

5. The system according to claim 4, wherein said fluid is air, and said pump is a compressor.

6. The system according to claim 5, wherein said compressor passively heats said air and supplies said heated air to said aeration laterals.

7. The system according to claim 1, wherein the distance between each hole increases in a direction towards the manifold to provide air distribution along the length of at least one of said aeration laterals.

8. The system according to claim 1, further including a vent communicating with the crushed stone to allow air to escape from the crushed stone.

* * * * *